United States Patent
Farrar et al.

(10) Patent No.: US 10,975,706 B2
(45) Date of Patent: Apr. 13, 2021

(54) FRUSTIC LOAD TRANSMISSION FEATURE FOR COMPOSITE STRUCTURES

(71) Applicant: UNITED TECHNOLOGIES CORPORATION, Farmington, CT (US)

(72) Inventors: Bryan H. Farrar, West Hartford, CT (US); Andrew J. Lazur, Laguna Beach, CA (US); Howard J. Liles, Newington, CT (US); Bryan P. Dube, Columbia, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 121 days.

(21) Appl. No.: 16/250,804

(22) Filed: Jan. 17, 2019

(65) Prior Publication Data

US 2020/0232332 A1 Jul. 23, 2020

(51) Int. Cl.
*F01D 5/28* (2006.01)
*F01D 5/14* (2006.01)
*F01D 9/04* (2006.01)
*F04D 29/64* (2006.01)
*F01D 25/24* (2006.01)
(Continued)

(52) U.S. Cl.
CPC .............. *F01D 5/284* (2013.01); *F01D 5/14* (2013.01); *F01D 5/141* (2013.01); *F01D 5/147* (2013.01); *F01D 5/18* (2013.01); *F01D 5/282* (2013.01); *F01D 9/04* (2013.01); *F01D 9/041* (2013.01); *F01D 25/24* (2013.01); *F04D 29/54* (2013.01); *F04D 29/64* (2013.01); *F05D 2220/32* (2013.01); *F05D 2240/11* (2013.01); *F05D 2240/80* (2013.01); *F05D 2300/6033* (2013.01)

(58) Field of Classification Search
CPC . F04D 29/54; F04D 29/64; F01D 5/14; F01D 5/141; F01D 9/041; F01D 5/18; F01D 5/282; F01D 9/04; F01D 25/24; F05D 2240/80; F05D 2240/11
See application file for complete search history.

(56) References Cited

U.S. PATENT DOCUMENTS 6,371,725 B1 * 4/2002 Manteiga .................. F01D 5/14
                                                  415/209.4
6,517,313 B2    2/2003 Rogers
(Continued)

FOREIGN PATENT DOCUMENTS

EP         3121384         1/2017

OTHER PUBLICATIONS

European Patent Office, European Search Report dated May 11, 2020 in Application No. 20152063.2.

*Primary Examiner* — J. Todd Newton
*Assistant Examiner* — Andrew J Marien
(74) *Attorney, Agent, or Firm* — Snell & Wilmer L.L.P.

(57) ABSTRACT

A stator vane may comprise an airfoil extending between a first platform and a second platform, the airfoil including a core extending relatively orthogonal to the first platform and the second platform, at least one of the first platform or second platform comprising a frustic load transmission feature, wherein the frustic load transmission feature comprises at least a first angular surface disposed proximate a platform edge, wherein the first angular surface is defined by a non-orthogonal angle θ with respect to an outer platform surface.

12 Claims, 10 Drawing Sheets

(51) Int. Cl.
 *F04D 29/54* (2006.01)
 *F01D 5/18* (2006.01)

(56) References Cited

U.S. PATENT DOCUMENTS

| | | | |
|---|---|---|---|
| 7,101,150 B2* | 9/2006 | Bash | F01D 9/042 |
| | | | 415/191 |
| 7,329,087 B2 | 2/2008 | Cairo et al. | |
| 9,238,969 B2* | 1/2016 | Batt | F01D 9/041 |
| 9,816,387 B2 | 11/2017 | Carr et al. | |
| 10,072,516 B2* | 9/2018 | Carr | F01D 9/042 |
| 2011/0008156 A1 | 1/2011 | Prentice et al. | |
| 2012/0055609 A1* | 3/2012 | Blanchard | C04B 35/62873 |
| | | | 156/89.11 |
| 2012/0070302 A1* | 3/2012 | Lee | F01D 9/04 |
| | | | 416/233 |
| 2014/0271208 A1* | 9/2014 | Garcia-Crespo | F01D 5/3084 |
| | | | 416/194 |
| 2016/0084096 A1 | 3/2016 | Carr et al. | |
| 2016/0222800 A1 | 8/2016 | Kleinow | |
| 2018/0010473 A1 | 1/2018 | Carr et al. | |

* cited by examiner

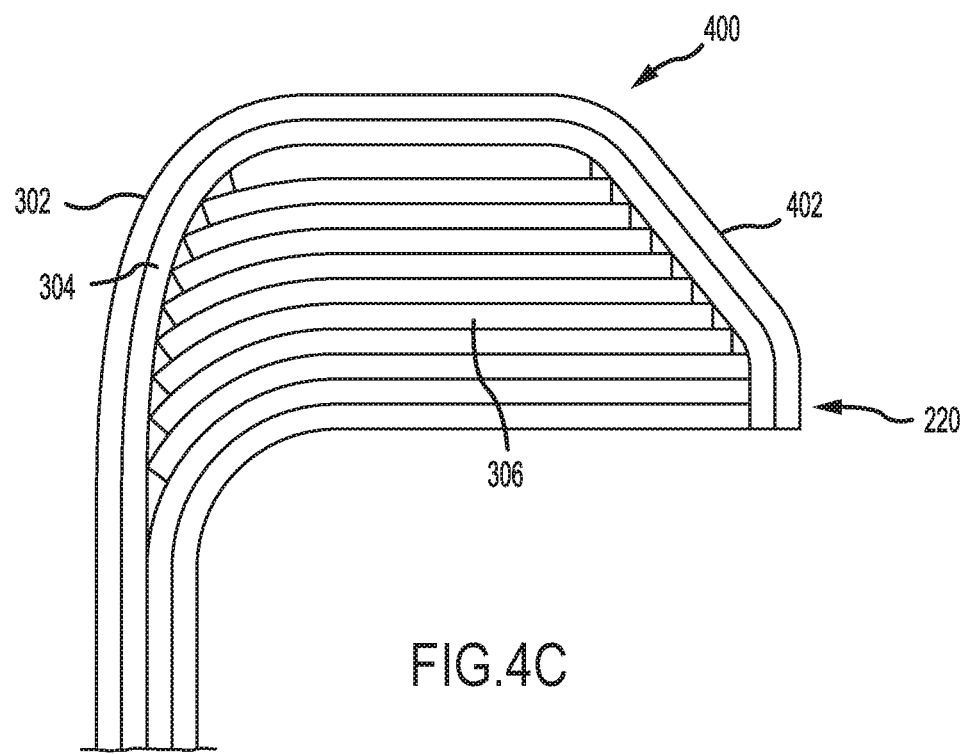
FIG.4C
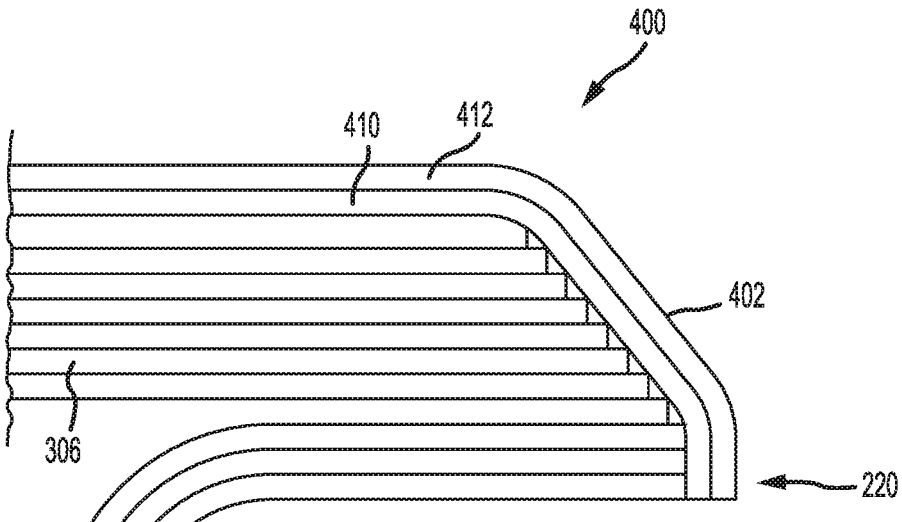
FIG.4B
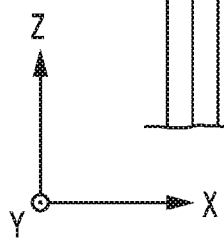

FRUSTIC LOAD TRANSMISSION FEATURE FOR COMPOSITE STRUCTURES

FIELD

The disclosure relates generally to ceramic matrix composite (CMC) structures in gas turbine engines and more particularly to ceramic matrix composite vanes.

BACKGROUND

Interlaminar properties of ceramic matrix composite (CMC) structures tend to have low relative strength compared to in plane load paths.

SUMMARY

In various embodiments the present disclosure provides a stator vane, comprising an airfoil extending between a first platform and a second platform, the airfoil including a core extending relatively orthogonal to the first platform and the second platform, at least one of the first platform or second platform comprising a frustic load transmission feature, wherein the frustic load transmission feature comprises at least a first angular surface disposed proximate a platform edge, wherein the first angular surface is defined by a non-orthogonal angle $\theta$ with respect to an outer platform surface.

In various embodiments, the first angular surface is recessed from the platform edge. In various embodiments, the angle $\theta$ is 45°±15°. In various embodiments, at least one of the first platform or the second platform comprises a plurality of platform layers, wherein the first angular surface of the frustic load transmission feature is formed in the plurality of platform layers. In various embodiments, the frustic load transmission feature further comprises a facial overwrap layer over the plurality of platform layers. In various embodiments, the stator vane further comprises a shear tube defining the core of the airfoil and extending relatively orthogonal through the first platform and the second platform, wherein the shear tube comprises a shear tube layer, wherein the shear tube layer is extended over the plurality of platform layers to form the facial overwrap layer. In various embodiments, an aerodynamic shear force transmitted through the plurality of platform layers is decomposed into a compressive force at the first angular surface.

In various embodiments, the present disclosure provides a vane assembly comprising an inner case, an outer case, and a stator vane, comprising an airfoil extending between a first platform and a second platform, the airfoil including a core extending relatively orthogonal to the first platform and the second platform, at least one of the first platform or second platform comprising a frustic load transmission feature, wherein the frustic load transmission feature comprises at least a first angular surface disposed proximate a platform edge, wherein the first angular surface is defined by a non-orthogonal angle $\theta$ with respect to an outer platform surface.

In various embodiments, the vane assembly further comprises a first vane retaining ring coupled between the first platform and the inner case, and a second vane retaining ring coupled between the second platform and the outer case, wherein at least one of the first vane retaining ring or the second vane retaining ring have an angular bearing surface comprising the angle $\theta$. In various embodiments, the angle $\theta$ is 45°±15°. In various embodiments, the frustic load transmission feature further comprises a notch at an inboard edge of the second platform, wherein the second vane retaining ring comprises a tooth extending from an inner diameter of the second vane retaining ring configured to interface with the notch and generate an interference in response to a torque applied to the vane. In various embodiments, at least one of the first platform or the second platform comprises a plurality of platform layers, wherein the first angular surface of the frustic load transmission feature is formed in the plurality of platform layers. In various embodiments, the frustic load transmission feature further comprises a facial overwrap layer over the plurality of platform layers. In various embodiments, the stator vane further comprises a shear tube defining the core of the airfoil and extending relatively orthogonal through the first platform and the second platform, wherein the shear tube comprises a shear tube layer, wherein the shear tube layer is extended over the plurality of platform layers to form the facial overwrap layer.

In various embodiments, the present disclosure provides a gas turbine engine comprising a compressor section configured to compress a gas, a combustor section aft of the compressor section and configured to combust the gas, and a stator vane, comprising an airfoil extending between a first platform and a second platform, the airfoil including a core extending relatively orthogonal to the first platform and the second platform, at least one of the first platform or second platform comprising a frustic load transmission feature, wherein the frustic load transmission feature comprises at least a first angular surface disposed proximate a platform edge, wherein the first angular surface is defined by a non-orthogonal angle $\theta$ with respect to an outer platform surface.

In various embodiments, the first angular surface is recessed from the platform edge. In various embodiments, the angle $\theta$ is 45°±15°. In various embodiments, at least one of the first platform or the second platform comprises a plurality of platform layers, wherein the first angular surface of the frustic load transmission feature is formed in the plurality of platform layers, wherein an aerodynamic shear force transmitted through the plurality of platform layers is decomposed into a compressive force at the first angular surface. In various embodiments, the frustic load transmission feature further comprises a facial overwrap layer over the plurality of platform layers. In various embodiments, the stator vane further comprises a shear tube defining the core of the airfoil and extending relatively orthogonal through the first platform and the second platform, wherein the shear tube comprises a shear tube layer, wherein the shear tube layer is extend over the plurality of platform layers to form the facial overwrap layer.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 4B illustrates a cross section of a frustic load transmission feature, in accordance with various embodiments;

FIG. 4C illustrates a cross section of a frustic load transmission feature, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
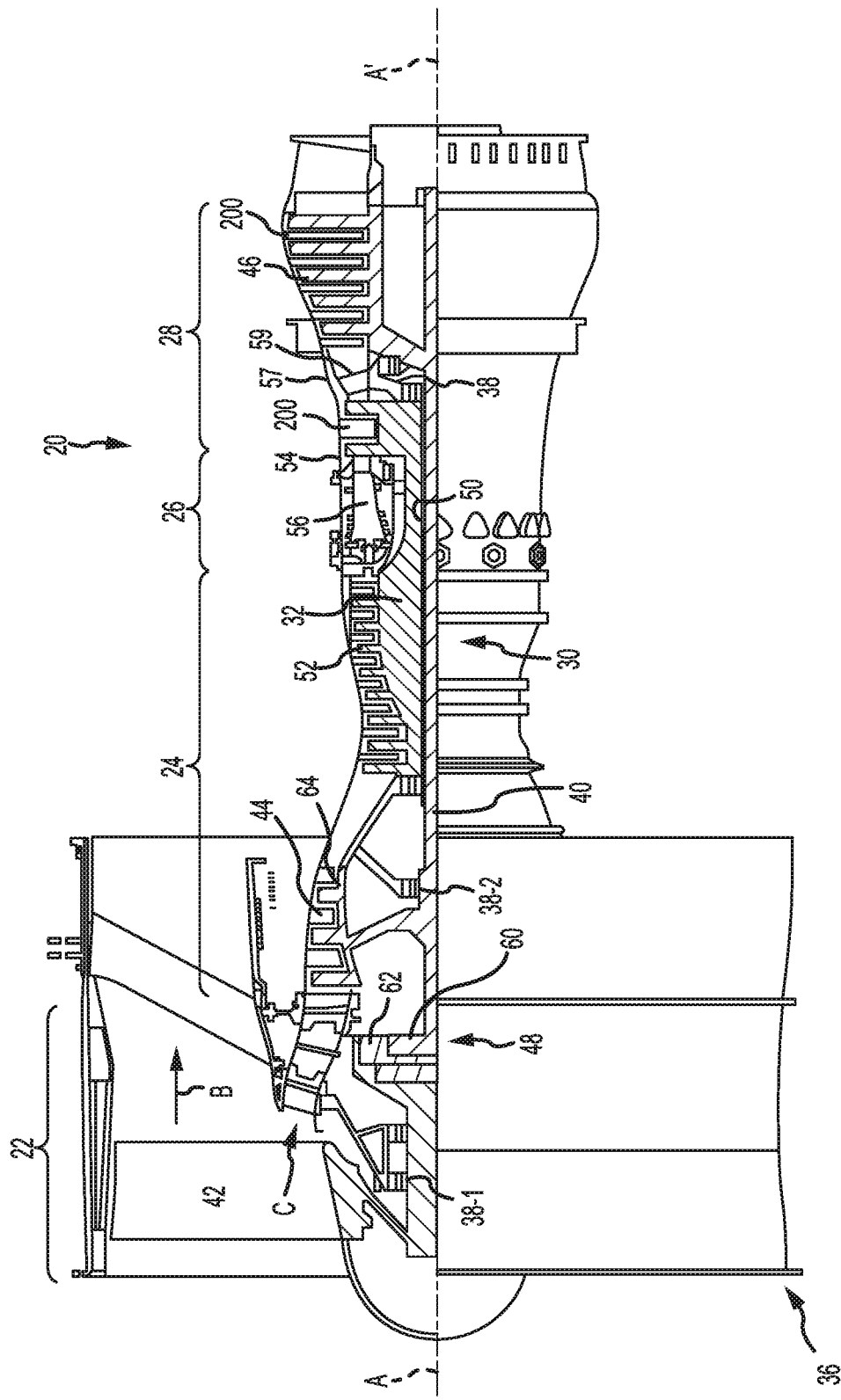
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2A:
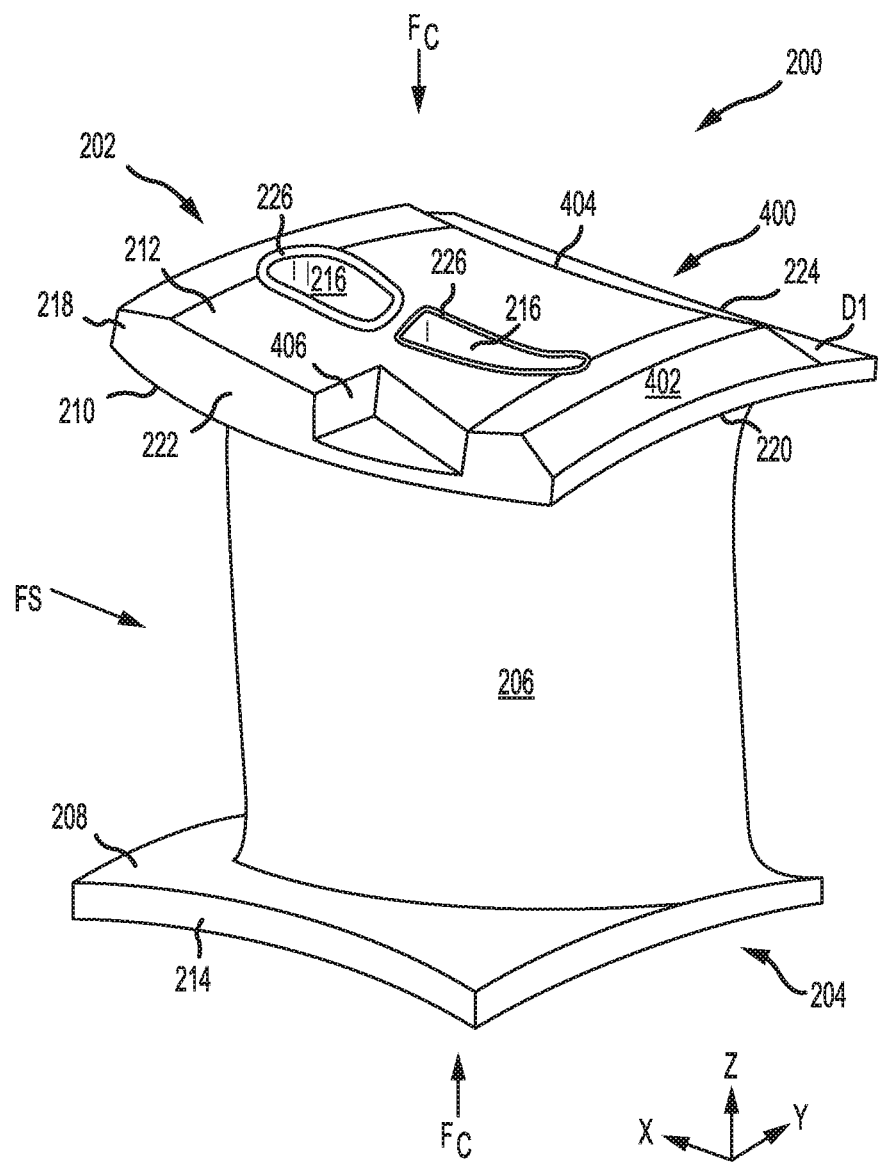
FIG. 2A illustrates a stator vane having a frustic load transmission feature, in accordance with various embodiments.

According to various embodiments and with reference to FIGS. 1 and 2A, a stator vane 200 having a frustic (i.e., comprising geometric features of or like a frustum) load transmission feature 400 with XYZ-axes provided for reference. Stator vane 200 comprises an airfoil 206 extending between an inner gas path surface 208 of a first platform 204 (i.e. an inner platform) and an outer gas path surface 210 of a second platform 202 (i.e. an outer platform). The first platform 204 is defined in extent along the Z-axis between the inner gas path surface 208 and inner platform surface 214 and, in like regard, the second platform 202 is defined in extent along the Z-axis between the outer gas path surface 210 and the outer platform surface 212. Each of the first platform 204 and the second platform 202 comprise a leading edge 218, a trailing edge 220, an inboard edge 222, and an outboard edge 224. Each platform is further defined in its extent along the X-axis between the leading edge 218 and the trailing edge 220 and in its extent along the Y-axis between the inboard edge 222 and the outboard edge 224. The frustic load transmission feature 400 may define a portion of the first platform 204 and/or the second platform 202.

Figure 2B:
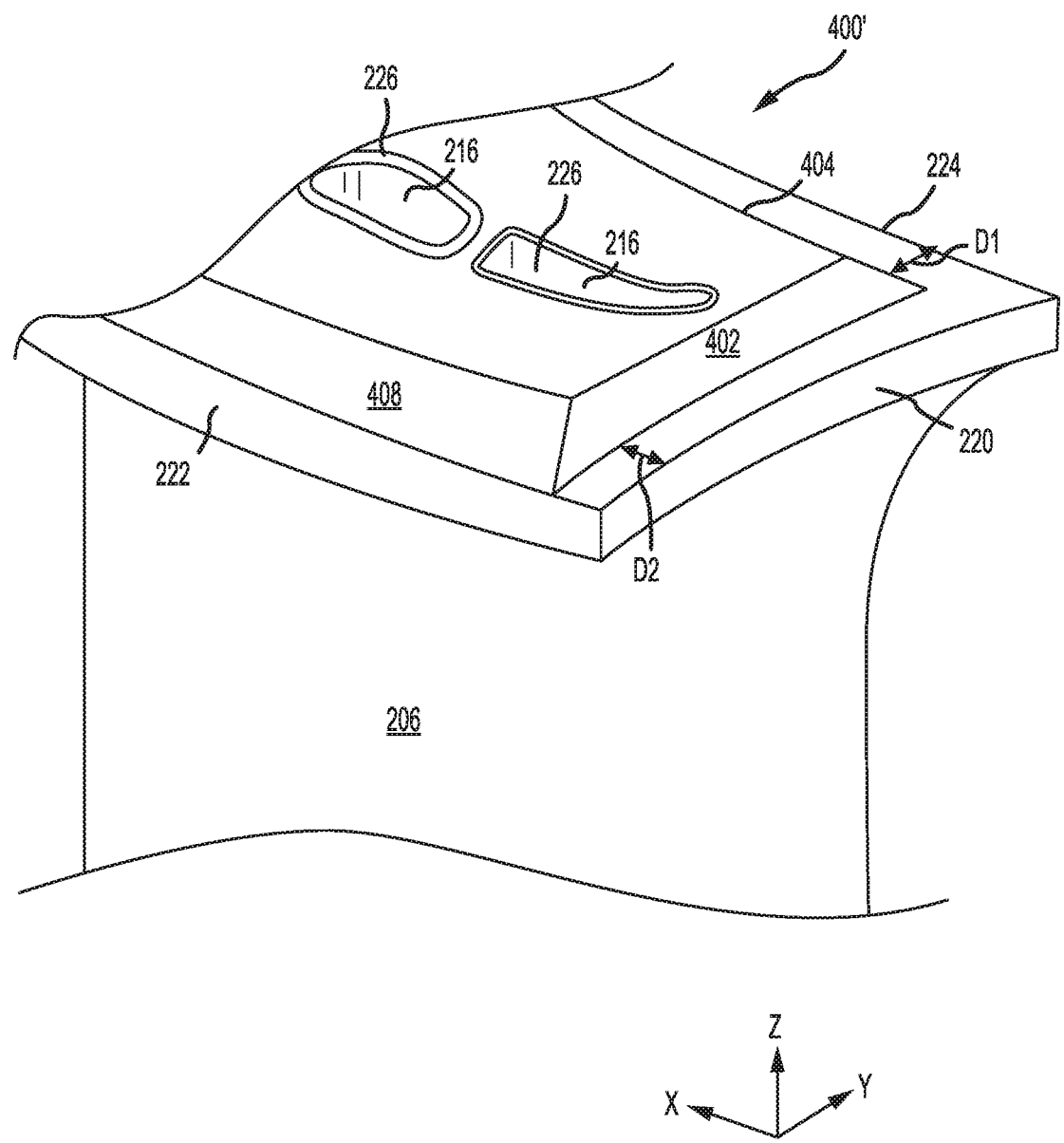
FIG. 2B illustrates a stator vane having a frustic load transmission feature, in accordance with various embodiments.

The frustic load transmission feature 400 comprises one or more non-orthogonal (relative to the XY-plane) angular surfaces of the respective platform which are angled inward relatively from a platform edge relatively toward a core such as first core 216. As illustrated in FIG. 2A, frustic load transmission feature 400 defines a portion of the second platform 202 between the outer gas path surface 210 and the outer platform surface 212. A first angular surface 402 extends inward from trailing edge 220 and a second angular surface 404 is recessed inward a distance D1 (as projected on the XY-plane) from outboard edge 224 and extends inward proximate outboard edge 224. A notch 406 is formed into the frustic load transmission feature 400 from the inboard edge 222. In various embodiments and with additional reference to FIG. 2B, a frustic load transmission feature 400' may have first angular surface 402 recessed by a second distance D2 from trailing edge 220 and may include a third angular surface extending inward from the inboard edge 222. In various embodiments D1 may and D2 may be varied and any number of angular surfaces may be recessed from the respective platform edge.

In various embodiments, one or more cores such as first core 216 and/or second core 216' may extend radially (along the Z-axis) through the airfoil 206. The core 216 may open through outer platform surface 212 of second platform 202 and inner platform surface 214 of first platform 204. In this regard, the inner platform surface 214 and the outer platform surface 212 may be in fluid communication through the first core 216. In various embodiments, a core such as the first core 216 may comprise a shear tube 226 which may define the circumference of the first core 216. During gas turbine engine 20 operation, stator vane 200 may experience compressive loading force $F_c$ in the radial direction (along the Z-axis) and may also experience aerodynamic shear loading $F_s$ in the XY-plane. In response to $F_s$, vane 200 may tend to torque about the Z-axis and tend to translate along Y-axis.

Figure 3A:
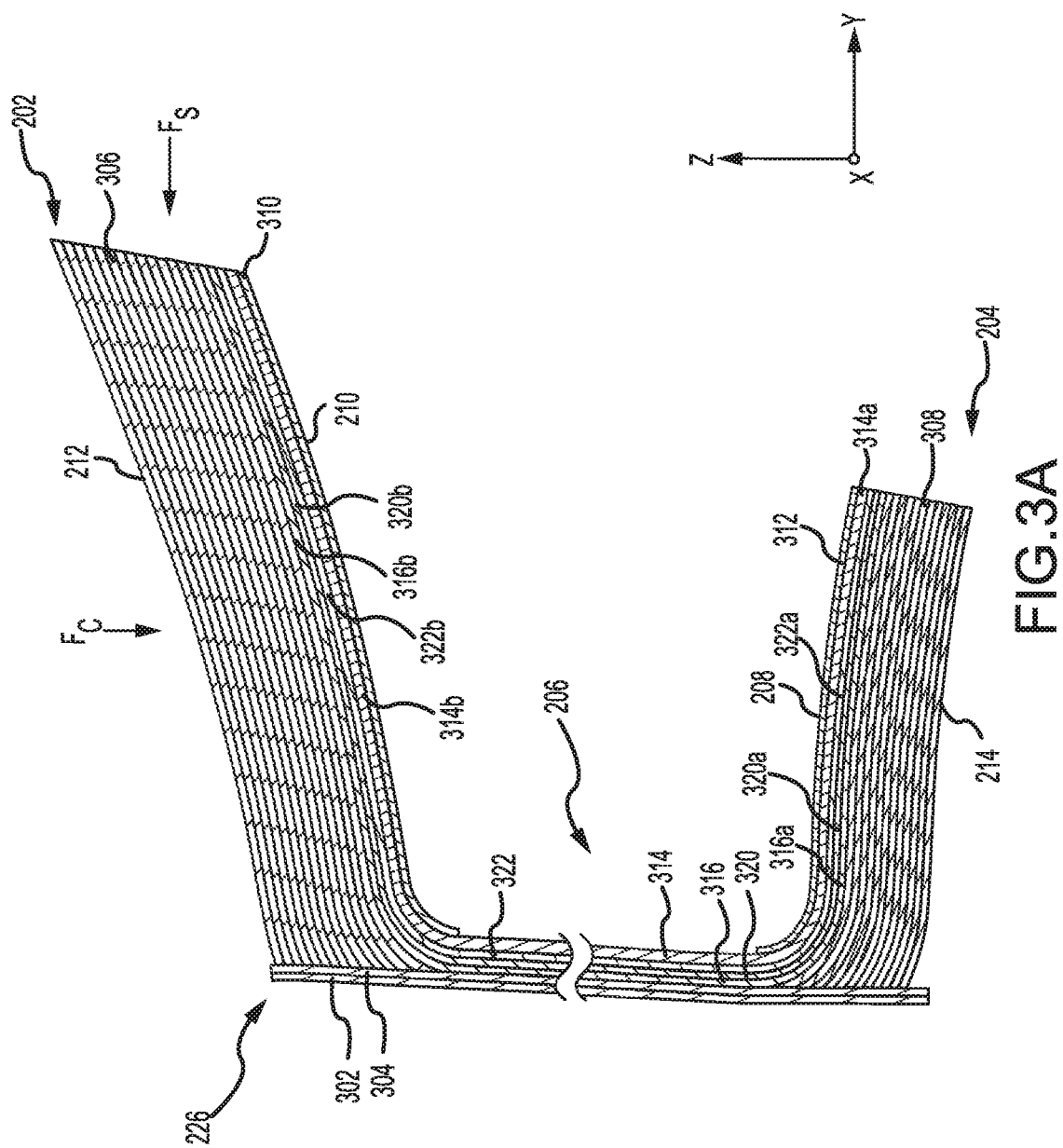
FIG. 3A illustrates a cross section of an stator vane having a shear tube, in accordance with various embodiments.
Figure 3B:
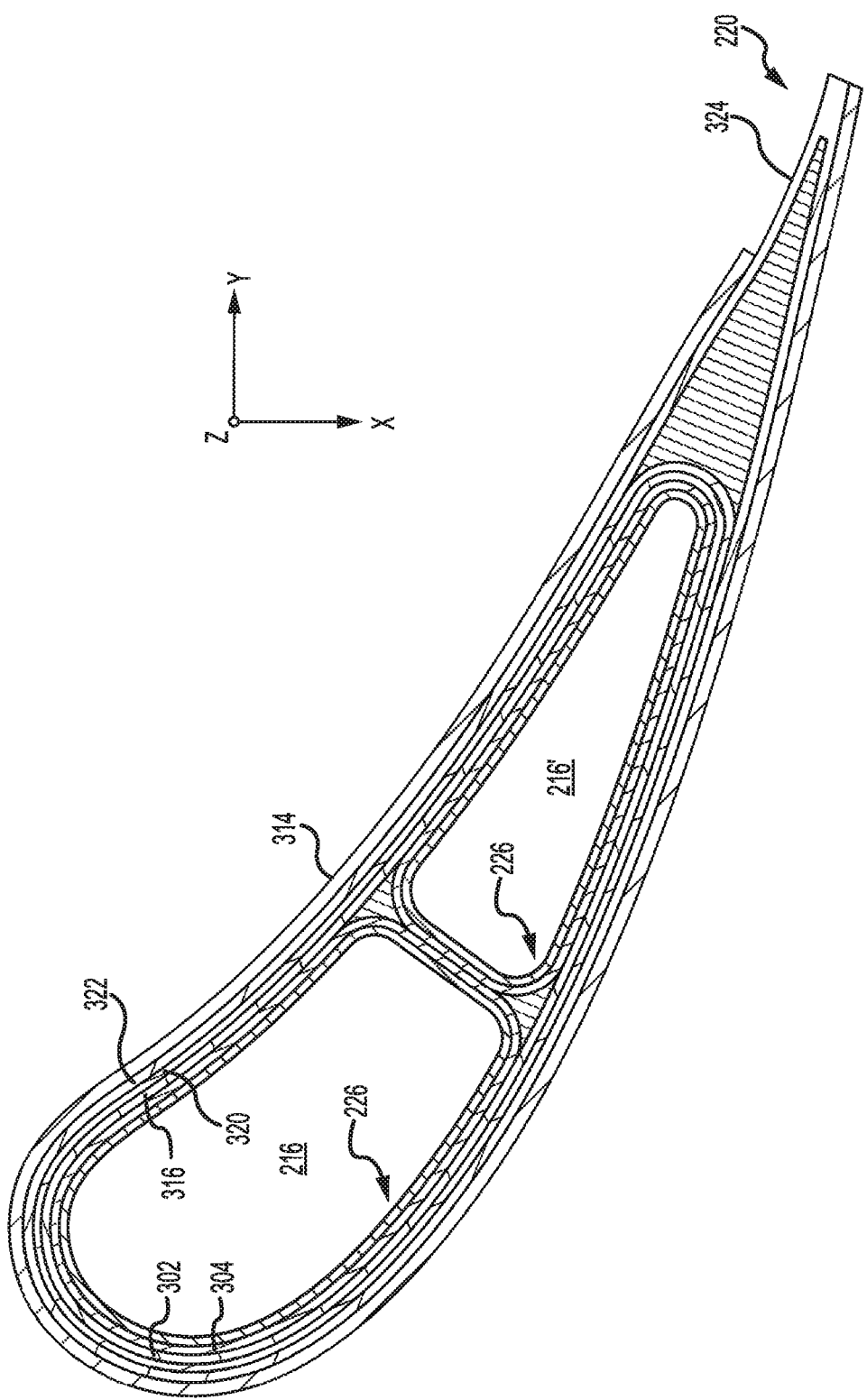
FIG. 3B illustrates a cross section of an airfoil having a shear tube, in accordance with various embodiments

In various embodiments and with additional reference to FIGS. 3A and 3B, stator vane 200 comprises a plurality of stacked, layered, and/or wrapped matrix plies and/or weaves. Stator vane 200 may be a Ceramic Matrix Composite (CMC) material such as, for example, one of a silicon-carbide/silicon-carbide matrix, carbon/carbon matrix, carbon/silicon-carbide matrix, alumina matrix, mullite matrix, or a zirconium boride matrix. FIG. 3A illustrates stator vane 200 in partial cross section through the ZY plane viewed along the X-axis. FIG. 3B illustrates a cross section of airfoil 206 of stator vane 200 through the XY plane viewed along the Z-axis. First platform 204 comprises a first plurality of platform plies 308 layered relatively coplanar with the XY plane and stacked (along the Z-axis). In a like manner, the second platform 202 comprises a second plurality of platform plies 306 layered relatively coplanar with the XY plane and stacked (along the Z-axis). The platform plies 306 and 308 may tend to be relatively resistant to compressive loading $F_c$ but, in response to shear loading $F_s$ applied relatively in plane to the platform plies 306 and 308, may tend to delaminate.

Airfoil 206 may be built up around one or more shear tubes 226 which may define the circumference of the first core 216 and the second core 216'. Shear tubes 226 may comprise one or more shear tube layers such as first shear tube layer 302 and second shear tube layer 304 which wrap around the Z-axis and extend along the Z-axis through the airfoil 206, the first platform 204 and the second platform 202. Stated another way, the shear tubes 226 are disposed relatively orthogonally (i.e. within 45°) to the first plurality of platform plies 308 and the second plurality of platform plies 306. In this regard, the shear tubes 226 may be relatively orthogonal to the first platform 204 and the second platform 202 and tend to resist aerodynamic shear force $F_s$ tending thereby to inhibit delamination of the first plurality of platform plies 308 and the second plurality of platform plies 306. In various embodiments, a shear tube 226 may be wrapped, braided, and/or a triaxially braided shear tube.

Airfoil 206 may further include one or more overbraid layers which wrap around the Z-axis about the shear tubes 226 such as first overbraid layer 316 and second overbraid layer 320. In various embodiments, the overbraid layers may be a continuous overbraid (e.g., a tube) with first platform ends (316a, 320a) and second platform ends (316b, 320b) feathered out and laid relatively in plane with the first the first plurality of platform plies 308 and the second plurality of platform plies 306 thereby forming a portion of the respective platform. In like regard, airfoil 206 may include a woven overlay 322 (e.g., a Y-weave overlay) about the overbraid layers with ends (322a, 322b) of the woven overlay 322 similarly feathered and laid relatively in plane with the first plurality of platform plies 308 and the second plurality of platform plies 306 and proximate first platform ends (316a, 320a) and second platform ends (316b, 320b).

An aerodynamic layer 314 wraps over the woven overlay 322 forming the aerodynamic surface of airfoil 206 with ends (314a, 314b) similarly feathered and laid relatively in plane with the first plurality of platform plies 308 and the second plurality of platform plies 306 and respectively contacting the ends (322a, 322b) of the woven overlay 322. In various embodiments, aerodynamic layer 314 may not fully overwrap the woven overlay 322 and may expose a portion 324 of the woven overlay 322 proximate the trailing edge 220 of airfoil 206. In various embodiments an inner gas path layer 312 may be layered over first platform end 314a of aerodynamic layer 314 and define the inner gas path surface 208. In like regard, an outer gas path layer 310 may be layered over the second platform end 314b of aerodynamic layer 314 and define the outer gas path surface 210. In this regard, airfoil 206 may be built up of multiple layers and a shear tube such as shear tube 226 may comprise any layer or any number of layers of an airfoil such as airfoil 206.

Figure 4A:
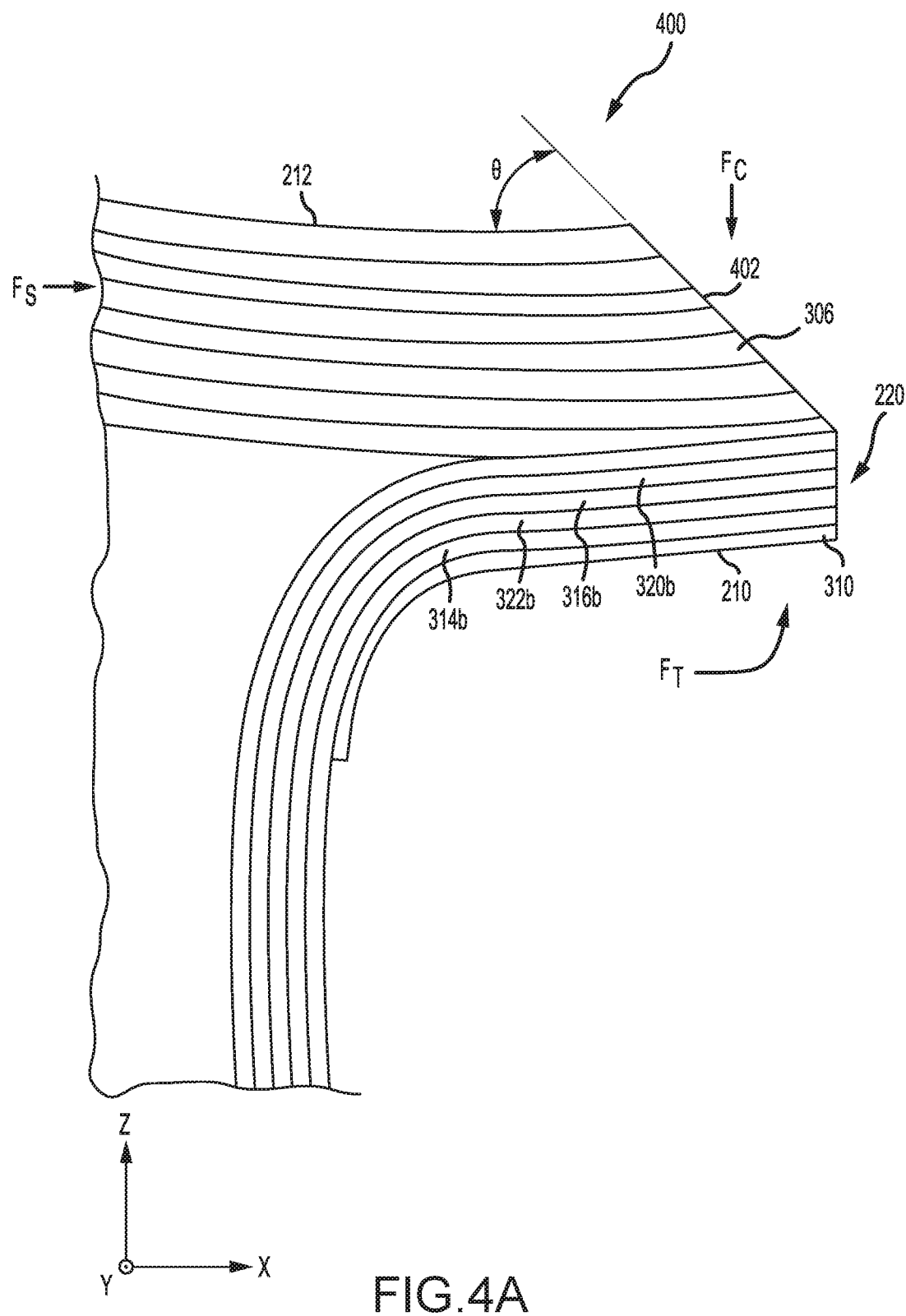
FIG. 4A illustrates a cross section of a frustic load transmission feature, in accordance with various embodiments.

With additional reference to FIGS. 4A, 4B, 4C, 4D, and 4E, frustic load transmission feature 400 is illustrated in partial cross section through the ZX-plane viewed along the Y-axis with first angular surface 402 shown passing through the page. As illustrated in FIG. 4A, an angular surface may be built up of or formed in one or more of the plurality of platform plies. For example, first angular surface 402 may built up of the first plurality of platform plies 306 which may be staggered in layers, machined, trimmed, molded, and/or the like to form a non-orthogonal angle θ with respect to the outer platform surface 212. In this regard, an angular surface such as first angular surface 402 may be defined by the non-orthogonal angle θ which may vary with respect to the corresponding angular surface. For example, the first angular surface 402 may comprise the angle θ1 and the second angular surface 404 may comprise the angle θ2. In various embodiments, θ may be 45°±15°. As described above, the platform plies 306 and 308 may tend to be relatively resistant to compressive loading $F_c$ but, in response to shear loading $F_s$ may tend to delaminate. When an angular surface such as first angular surface 402 is contacted with a corresponding bearing surface such as, for example, a turbine case or vane retaining ring $F_s$ may be transmitted to the bearing surface via the first angular surface 402. In response, the shear force $F_s$ is decomposed into a component of compressive force $F_c$ having a magnitude as a function of the shear force $F_s$ and the angle θ with the magnitude of the compressive force $F_c$ increasing as θ decreases.

The component of compressive force $F_c$ acts along the first angular surface 402 tending thereby to inhibit delamination of the platform plies 306. In this regard, the frustic load transmission feature may tend to inhibit delamination of the plurality of platform along edges having corresponding angular faces. In various embodiments and in operation within a high temperature gas path (e.g. high pressure compressor, combustor exit, turbine, etc.) of a gas turbine engine such as gas turbine engine 20, vane 200 may tend to undergo thermally driven expansion or growth. In various embodiments, the major axis of thermal growth may tend to occur along the plane of the various matrix plies. In this regard, airfoil 206 may tend to experience growth along the Z-axis with first platform 204 and second platform 202 tending to experience growth in the ZY-plane which may tend to develop thermal stress $F_t$. The thermal stress $F_t$ may manifest proximate edges such as trailing edge 220 and tend to cause the edge to curl relatively upward along the Z-axis thereby distorting the shape of gas path surface and tending to degrade performance of the engine. First angular surface 402 tends to resist the thermal stress $F_t$ with the compressive force $F_c$ at first angular surface 402. In this regard, the frustic load transmission feature 400 may tend to inhibit thermally driven curling distortion of a vane platform.

In various embodiments and with reference to FIGS. 4B and 4C, the frustic load transmission feature 400 may include one or more facial overwrap layers such as first facial overwrap layer 410 and second facial overwrap layer 412 over the plurality of platform plies 306. Facial overwrap layers (410, 412) may tend to promote load distribution along each of the angular surfaces (e.g., angular surface 402) of the frustic load transmission feature 400. Facial overwrap layers may tend to further inhibit delamination of the plurality of platform plies such as, for example, platform plies 306. In various embodiments and as illustrated in FIG. 4C, the first shear tube layer 302 and/or the second shear tube layer 304 may be extended over the plurality of platform plies 306 to form facial overwrap layers.

Figure 4D:
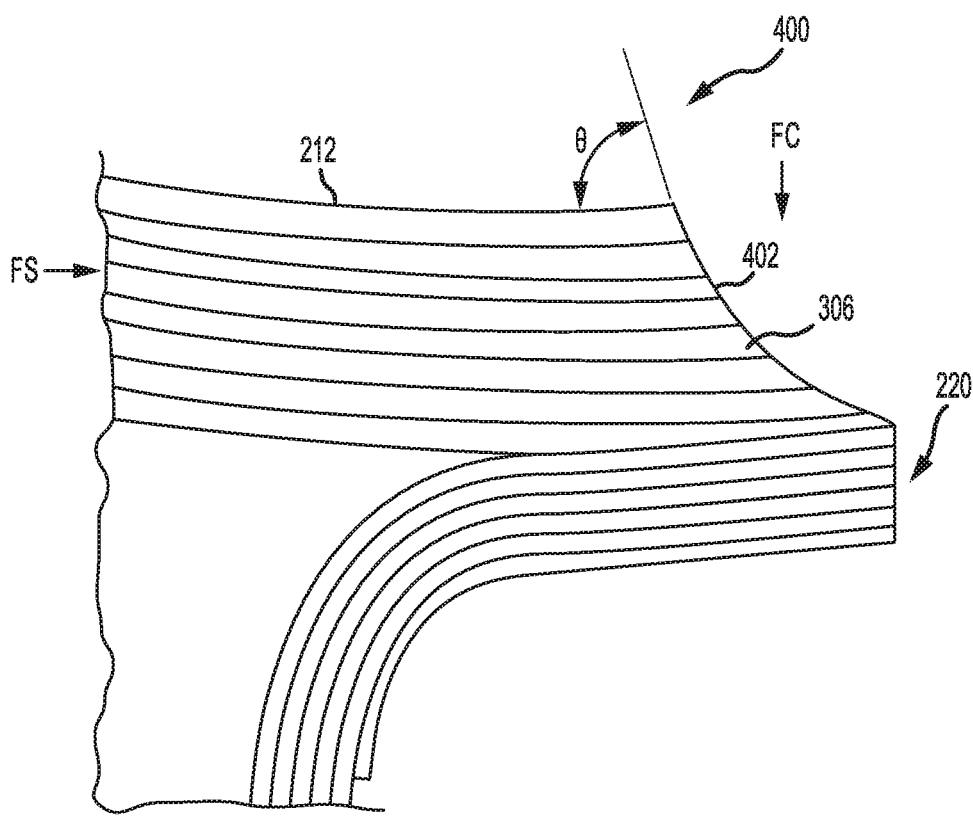
FIG. 4D illustrates a cross section of a frustic load transmission feature, in accordance with various embodiments.
Figure 4E:
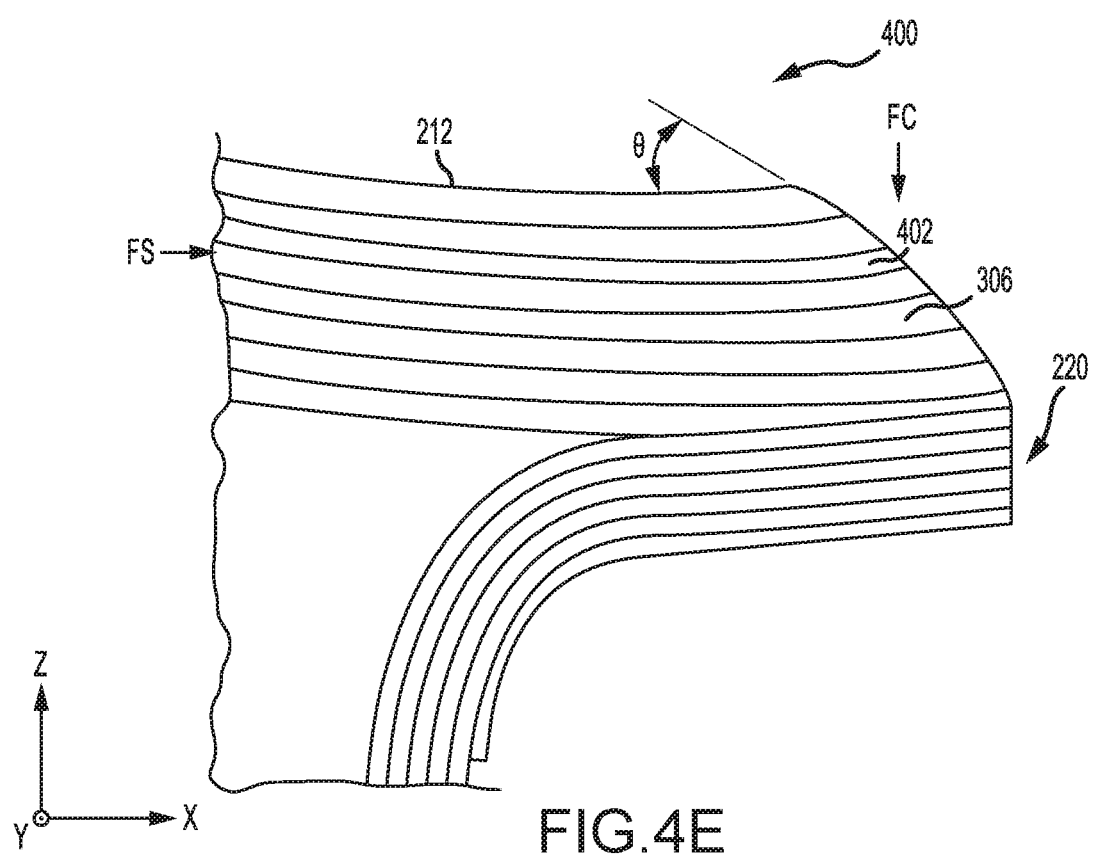
FIG. 4E illustrates a cross section of a frustic load transmission feature, in accordance with various embodiments.

In various embodiments and with reference to FIGS. 4D and 4E, frustic load transmission feature 400 may include an angular surface having curvilinear features. For example, the first plurality of platform plies 306 may be staggered in layers, machined, trimmed, molded, and/or the like such that angular surface 402 may have a concave curvature as shown in FIG. 4D. In another example as shown in FIG. 4E the first plurality of platform plies 306 may be staggered in layers, machined, trimmed, molded, and/or the like such that angular surface 402 may have a convex curvature. In various embodiments the curvilinear features may comprise a compound curvature extending along the axial extent (i.e., describing a curve in XY-plane) of the angular face 402 in addition to along the thickness of the first plurality of platform plies 306 (i.e., describing the curve in the ZX-plane).

Figure 5:
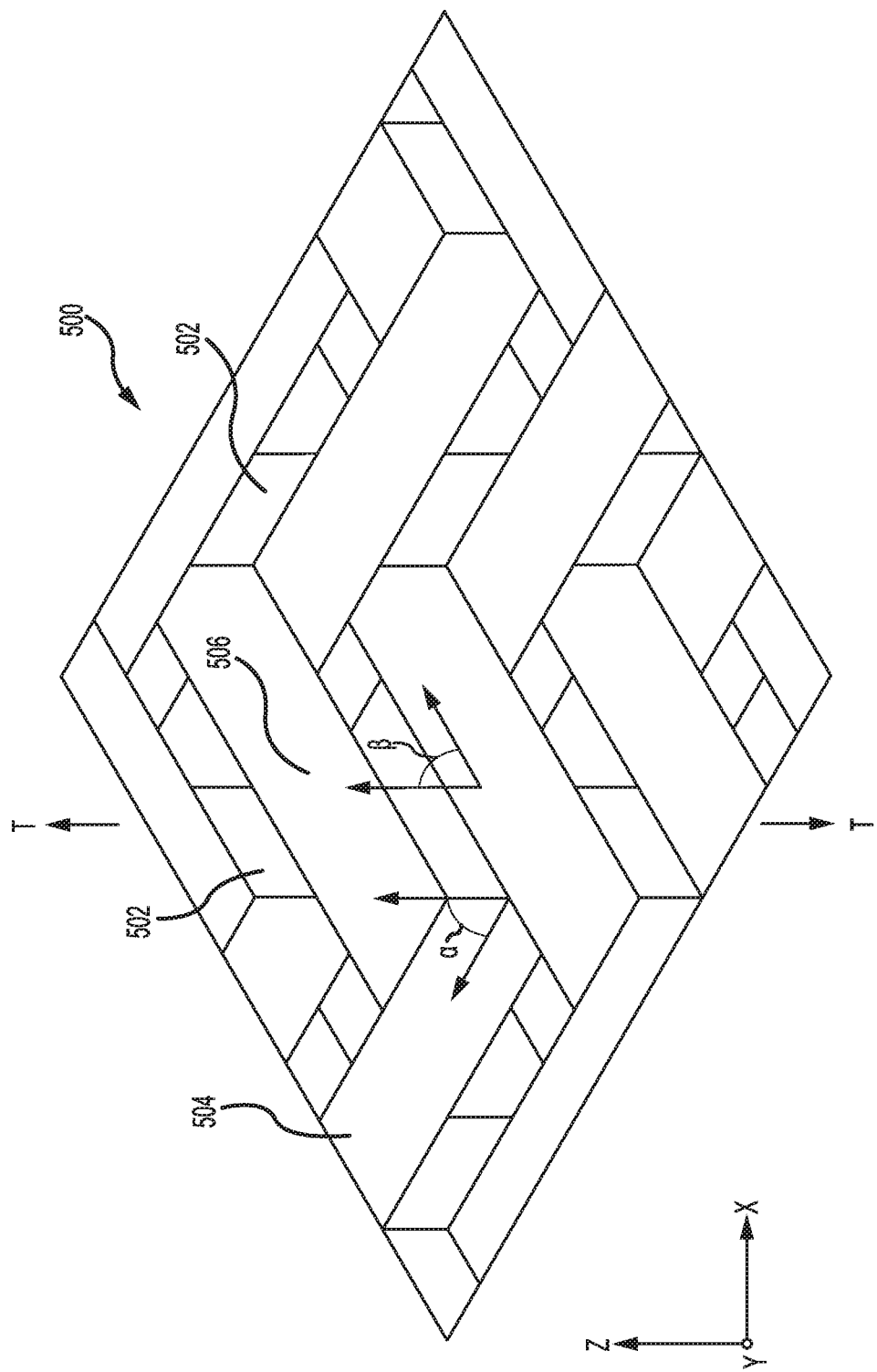
FIG. 5 illustrates a section of triaxially braided layer, in accordance with various embodiments.

In various embodiments and with additional reference to FIG. 5, a section 500 of a triaxially braided layer is illustrated in accordance with various embodiments showing details of the braided fibers. Section 500 includes a plurality of axial fibers 502 which are wrapped relatively between first bias fibers 504 and second bias fibers 506. The intersection between the first bias fibers 504 and the axial fibers 502 define a first bias angle α and, in like regard, the intersection between the second bias fibers 506 and the axial fibers 502 define a second bias angle β. The first bias angle and the second bias angle may be configured to improve the material properties of a layer. In various embodiments, bias angle α and bias angle β may be equal. In various embodiments bias angle α may be between 20° and 70° and bias angle β may be between 20° and 70°.

In various embodiments, the first shear tube layer 302 and the second shear tube layer 304 may comprise triaxially braided layers having the axial fibers 502 oriented radially (parallel the Z-axis). In this regard shear tube 226 may be a triaxially braided shear tube. In various embodiments, first overbraid layer 316 and second overbraid layer 320 may comprise triaxially braided layers having the axial fibers 502 oriented axially (parallel the X-axis). In this regard, aerodynamic shear force $F_s$ may be transferred compressively through the layers of airfoil 206, first platform 204 and second platform 202 and, in response, tending to induce a bending and in plane shear force T in fibers (502, 504, 506) of the triaxially braided shear tubes 226 which tends to resist the transmitted aerodynamic shear force $F_s$. In this regard, a closed section of shear tubes 226 tends to increase its shear loading capacity thereby tending to enhance the overall shear strength of vane 200.

Figure 6:
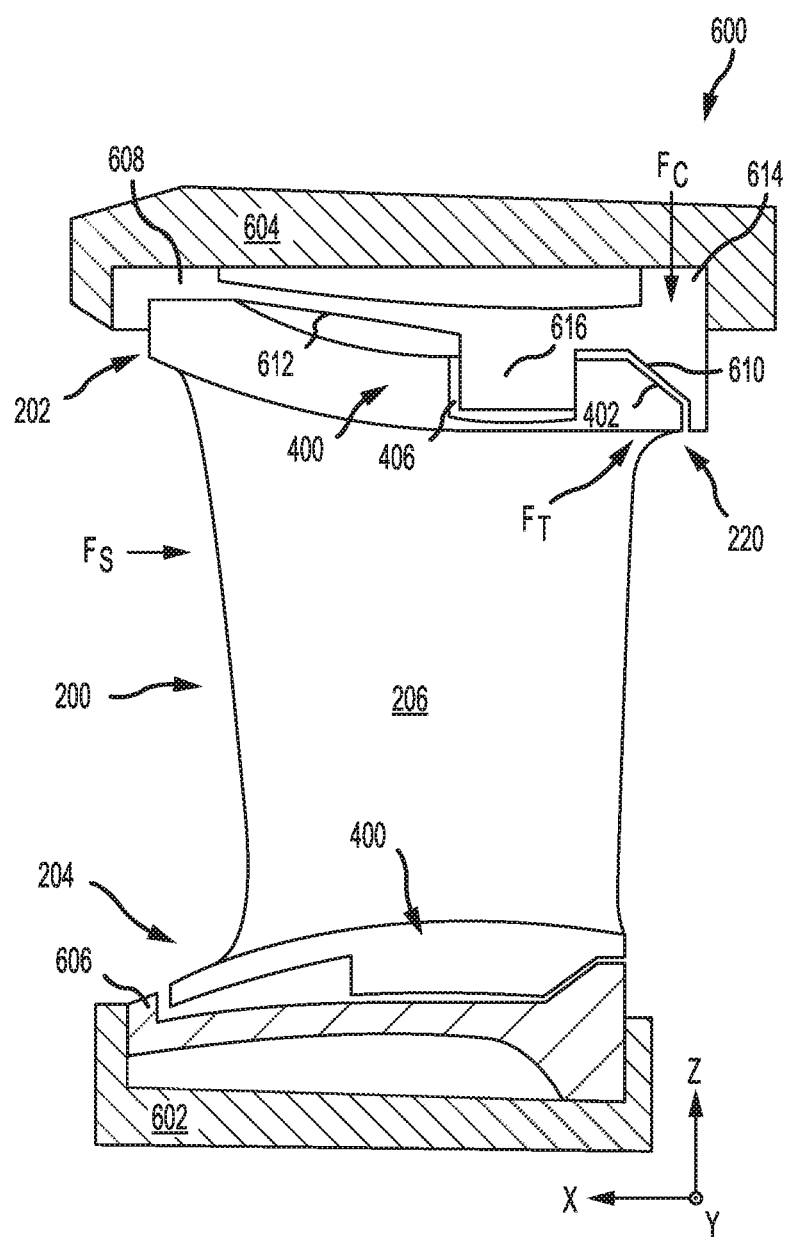
FIG. 6 illustrates a vane assembly, in accordance with various embodiments.

In various embodiments and with additional reference to FIG. 6, a vane assembly 600 is illustrated in cross section through the ZX-plane. Vane assembly 600 includes stator vane 200 having frustic load transmission features 400. Vane 200 is coupled between an inner case 602 and an outer case 604, such as, for example one of combustor 56 and/or HPT 54. In various embodiments, a first vane retaining ring 606 and a second vane retaining ring 608 may support the vane 200 and fix the vane 200 relative to the inner case 602 and the outer case 604. Each of the first vane retaining ring 606 and the second vane retaining ring 608 comprise an annular cylindrical structure and may comprise one or more accurate segments. In various embodiments, the first vane retaining ring 606 is configured to couple between first platform 204 and the inner case 602. In like regard, the second vane retaining ring 608 is configured to couple between the second platform 202 and the outer case 604.

In various embodiments, a vane retaining ring may include an angular bearing surface comprising the angle θ corresponding to an angular face of the frustic load transmission feature. For example, the second vane retaining ring 608 has angular bearing surface 610 about inner diameter 612. Angular bearing surface 610 comprises the angle θ corresponding to first angular surface 402 tending thereby to enable decomposition of the shear force $F_s$ and thermal stress $F_t$ into the compressive force $F_c$ component between the angular surface 402 and the angular bearing surface 610. In this regard, the shear force $F_s$ and thermal stress $F_t$ may then be transmitted through the interface between the angular bearing surface 610 and the angular surface 402 to the outer case 604 via the orthogonal bearing surfaces 614 at the outer diameter of the second vane retaining ring 608.

In various embodiments, the second vane retaining ring 608 may comprise an anti-torque feature such as tooth 616 extending relatively inward (along the Z-axis) from the inner diameter 612. Tooth 616 is configured to interface with notch 406 of the frustic load transmission feature 400 at inboard edge 222. In response to vane 200 tending to torque about the Z-axis, notch 406 contacts tooth 616 and in response generates an interference tending to inhibit torqueing of the vane 200.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator vane, comprising:
    an airfoil extending between a first platform and a second platform,
    the airfoil including a core extending relatively orthogonal to the first platform and the second platform,
    at least one of the first platform or the second platform comprising a frustic load transmission feature,
    wherein the frustic load transmission feature comprises at least a first angular surface disposed proximate a platform edge,
    wherein the first angular surface is defined by a non-orthogonal angle θ with respect to an outer platform surface, wherein the angle θ is 45°±15°,
    wherein first platform and the second platform comprises a plurality of platform layers, wherein the first angular surface of the frustic load transmission feature is formed in the plurality of platform layers,
    wherein the frustic load transmission feature further comprises a facial overwrap layer over the plurality of platform layers,
    and wherein the facial overwrap layer extends over the frustic load transmission feature in plane with the angle θ and transverse to the plane of the plurality of platform layers.

2. The stator vane of claim 1, wherein the first angular surface is recessed from the platform edge.

3. The stator vane of claim 1, further comprising a shear tube defining the core of the airfoil and extending relatively orthogonal to the first platform and the second platform, wherein the shear tube extends through the first platform and the second platform,
wherein the shear tube comprises a shear tube layer,
wherein the shear tube layer is extended over the plurality of platform layers to form the facial overwrap layer.

4. The stator vane of claim 1, wherein an aerodynamic shear force transmitted through the plurality of platform layers is decomposed into a compressive force at the first angular surface.

5. A vane assembly comprising:
an inner case;
an outer case; and
a stator vane, comprising:
an airfoil extending between a first platform and a second platform,
the airfoil including a core extending relatively orthogonal to the first platform and the second platform,
at least one of the first platform or the second platform comprising a frustic load transmission feature,
wherein the frustic load transmission feature comprises at least a first angular surface disposed proximate a platform edge,
wherein the first angular surface is defined by a non-orthogonal angle θ with respect to an outer platform surface, wherein the angle θ is 45°±15°,
wherein the first platform and the second platform comprises a plurality of platform layers, wherein the first angular surface of the frustic load transmission feature is formed in the plurality of platform layers,
wherein the frustic load transmission feature further comprises a facial overwrap layer over the plurality of platform layers,
and wherein the facial overwrap layer extends over the frustic load transmission feature in plane with the angle θ and transverse to the plane of the plurality of platform layers.

6. The vane assembly of claim 5, further comprising:
a first vane retaining ring coupled between the first platform and the inner case; and
a second vane retaining ring coupled between the second platform and the outer case,
wherein at least one of the first vane retaining ring or the second vane retaining ring have an angular bearing surface comprising the angle θ.

7. The vane assembly of claim 6, wherein the frustic load transmission feature further comprises a notch at an inboard edge of the second platform,
wherein the second vane retaining ring comprises a tooth extending from an inner diameter of the second vane retaining ring configured to interface with the notch and generate an interference in response to a torque applied to the stator vane.

8. The vane assembly of claim 5, further comprising a shear tube defining the core of the airfoil and extending relatively orthogonal to the first platform and the second platform,
wherein the shear tube extends through the first platform and the second platform,
wherein the shear tube comprises a shear tube layer,
wherein the shear tube layer is extended over the plurality of platform layers to form the facial overwrap layer.

9. A gas turbine engine comprising:
a compressor section configured to compress a gas;
a combustor section aft of the compressor section and configured to combust the gas; and
a stator vane, comprising:
an airfoil extending between a first platform and a second platform,
the airfoil including a core extending relatively orthogonal to the first platform and the second platform,
at least one of the first platform or the second platform comprising a frustic load transmission feature,
wherein the frustic load transmission feature comprises at least a first angular surface disposed proximate a platform edge,
wherein the first angular surface is defined by a non-orthogonal angle θ with respect to an outer platform surface, wherein the angle θ is 45°±15°,
wherein the first platform and the second platform comprises a plurality of platform layers, wherein the first angular surface of the frustic load transmission feature is formed in the plurality of platform layers,
wherein the frustic load transmission feature further comprises a facial overwrap layer over the plurality of platform layers,
and wherein the facial overwrap layer extends over the frustic load transmission feature in plane with the angle θ and transverse to the plane of the plurality of platform layers.

10. The gas turbine engine of claim 9, wherein the first angular surface is recessed from the platform edge.

11. The gas turbine engine of claim 9, wherein an aerodynamic shear force transmitted through the plurality of platform layers is decomposed into a compressive force at the first angular surface.

12. The gas turbine engine of claim 9, further comprising a shear tube defining the core of the airfoil and extending relatively orthogonal to the first platform and the second platform,
wherein the shear tube extends through the first platform and the second platform,
wherein the shear tube comprises a shear tube layer,
wherein the shear tube layer is extended over the plurality of platform layers to form the facial overwrap layer.

* * * * *